United States Patent
Saito et al.

(10) Patent No.: US 6,804,231 B1
(45) Date of Patent: Oct. 12, 2004

(54) INPUT DISTRIBUTION TYPE PACKET SWITCH NETWORK AND AN INPUT DISTRIBUTION TYPE PACKET SWITCH

(75) Inventors: Tadao Saito, Yokohama (JP); Hitoshi Aida, Kawasaki (JP); Hiroaki Morino, Machida (JP); Thai Thach Bao, Adachi-Ku (JP)

(73) Assignee: The University of Tokyo, Tokyo (JP)

( * ) Notice: Subject to any disclaimer, the term of this patent is extended or adjusted under 35 U.S.C. 154(b) by 709 days.

(21) Appl. No.: 09/666,426

(22) Filed: Sep. 21, 2000

(30) Foreign Application Priority Data

Feb. 8, 2000 (JP) ........................................ 2000-030506

(51) Int. Cl.[7] .............................................. H04L 12/50
(52) U.S. Cl. ...................... 370/388; 370/369; 370/389
(58) Field of Search ................................ 370/386, 387, 370/388, 474, 389, 369

(56) References Cited

U.S. PATENT DOCUMENTS 5,299,317 A * 3/1994 Chen et al. .................. 710/317
5,617,413 A * 4/1997 Monacos ..................... 370/400
5,799,015 A * 8/1998 Bennett et al. .............. 370/388
6,335,930 B1 * 1/2002 Lee ............................. 370/387
6,477,173 B1 * 11/2002 Saito et al. .................. 370/411
6,525,563 B2 * 2/2003 Hamano et al. .............. 326/41

OTHER PUBLICATIONS

Yeh et al, IEEE Journal on Selected Areas in Communications, vol. SAC–5, No. 8, Oct. 1987, The Knockout Switch: A simple, Modular Architecture for High–Perfromance Packet Switching.*

* cited by examiner

Primary Examiner—John Pezzlo
(74) Attorney, Agent, or Firm—Oliff & Berridge, PLC

(57) ABSTRACT

An input distribution packet switch network includes a plurality of 2×2 switch elements and packet input modules for the switch network. The switch elements are arranged in multistage and connected in accordance with Shuffle type topology to constitute a N×N switch network (N=$2^k$, k: integer number of 2 and over). The links of the leftmost and rightmost switch elements are connected to one another so that the N×N switch network can have a ring architecture. The packet input modules are distributed laterally in the switch network.

14 Claims, 4 Drawing Sheets

INPUT DISTRIBUTION TYPE PACKET SWITCH NETWORK AND AN INPUT DISTRIBUTION TYPE PACKET SWITCH

BACKGROUND OF THE INVENTION

1) Field of the Invention

This invention relates to an input distribution type packet switch network and an input distribution type packet switch, more particularly an input distribution type packet switch network and an input distribution type packet switch which are preferably usable for large capacity-high speed digital communications, etc.

2) Description of the Prior Art

A circuit exchanging system and a packet-switching exchanging system are proposed and practically used as communication techniques to develop high speed digital communications.

In the circuit exchanging system, constant bit role line is provided to terminals to correspond to the request of the terminals. That is, a given digital signal is time division-multiplexed by bite unit, and time slots in a frame are recorded in a data buffer memory and read out in accordance with the predetermined order. In communication, since the time slots are read out in accordance with the predetermined order, the circuit exchanging system is suitable for a long time-communication at a constant speed.

On the other hand, in packet-switching exchanging system, a given digital signal is divided into packets having suitable size. Then, controlling information, such as an address, is added to the header of each packet, and the given digital signal is transmitted based on the controlling information. The size (length) of the packet is variable depending on the nature of the data. Therefore, the packet-switching exchanging system can have more communication patterns than the circuit exchanging system.

In the switching of the packet in the packet-switching exchanging system, a packet to be applied is divided into ATM cells, applied into a multistage connecting switch network, and is fabricated again into the packet in output. In this case, since reassembled traffic to be applied may be concentrated at some input ports and its nature has difficulty in being predicted, a Tandem Banyan switch or a MS4 switch is employed as a re-routing type multistage connecting switch network.

In the Banyan switch, if misrouting of a cell occurs in a Banyan switch network, the re-routing is not started until the cell is input into the next stage-Banyan switch network. As a result, misrouted cells cause the increase of the packet loss. Particularly, if a large traffic is input, the Banyan switch near the input side tends to have substantial misrouting and thus, have substantial packet loss.

On the other hand, in the MS4 switch, if misrouting of a cell occurs, the re-routing is started in the next stage switch element in the same switch network. Therefore, since the MS4 switch has a higher utilization efficiency of switch element and shorter time in re-routing than the Banyan switch, it can have relatively less packet loss.

However, since all of the cells are input from the left side of the MS4 switch network, if a large traffic is input into the MS4 switch network in high load, the misroute is apt to occur. Therefore, in this case, even the MS4 switch has relatively much packet loss.

SUMMARY OF THE INVENTION

It is an object of the present invention to provide a packet switch network and a packet switch which can reduce packet loss rate through the repressing of probability of misroute.

To achieve the object, this invention is directed to an input distribution packet switch network comprising a plurality of 2×2 switch elements and packet input modules for the switch network. The switch elements are arranged in multistage and connected in accordance with Shuffle type topology and they constitute a N×N switch network ($N=2^k$, k: integral number of 2 and over), the links of the leftmost and rightmost switch elements being connected one another so that the N×N switch network can have a ring architecture, the packet input modules being distributed laterally in the switch network.

Being different from the conventional re-routing type multistage connecting switch network, the packet can be directly applied into the switch network without the division for ATM cells, so that the switching throughput can be largely reduced.

Moreover, the packet input modules are placed and distributed laterally in the switch network. Therefore, if a large traffic is applied, each switch element in the switch network can have relatively small load because the packet input modules are distributed. Then, since the collision between the packets can be repressed, probability of misroute of the packet can be reduced. Consequently, the re-routing of the packet can be repressed and thus, packet loss rate can be reduced.

Furthermore, the switch elements constituting the switch network are connected in a ring architecture. Therefore, if the packet is applied from the rear packet input module of the switch network, it is transmitted to the leftmost switch element from the rightmost switch element in the switch network. Therefore, number of stages in the network is enough to switch the input packet network is.

Moreover, in the input distribution type packet switch network of the present invention, since the backward and frontward switch elements are effectively used through the transmission therebetween, the utilization efficiency of the switch elements can be enhanced. Therefore, the number of the switch elements constituting the switch network can be decreased.

Moreover, an input distribution type packet switch of the present invention has a first header processing part and a second header processing part. As described later, these header processing components are composed so as to be used as a practical switch through the addition of a switching header to applied packets.

BRIEF DESCRIPTION OF THE DRAWINGS

For better understanding of the present invention, reference is made to the attached drawings, wherein.

DESCRIPTION OF THE PREFERRED EMBODIMENTS

This invention will be described in detail.

Figure 1:
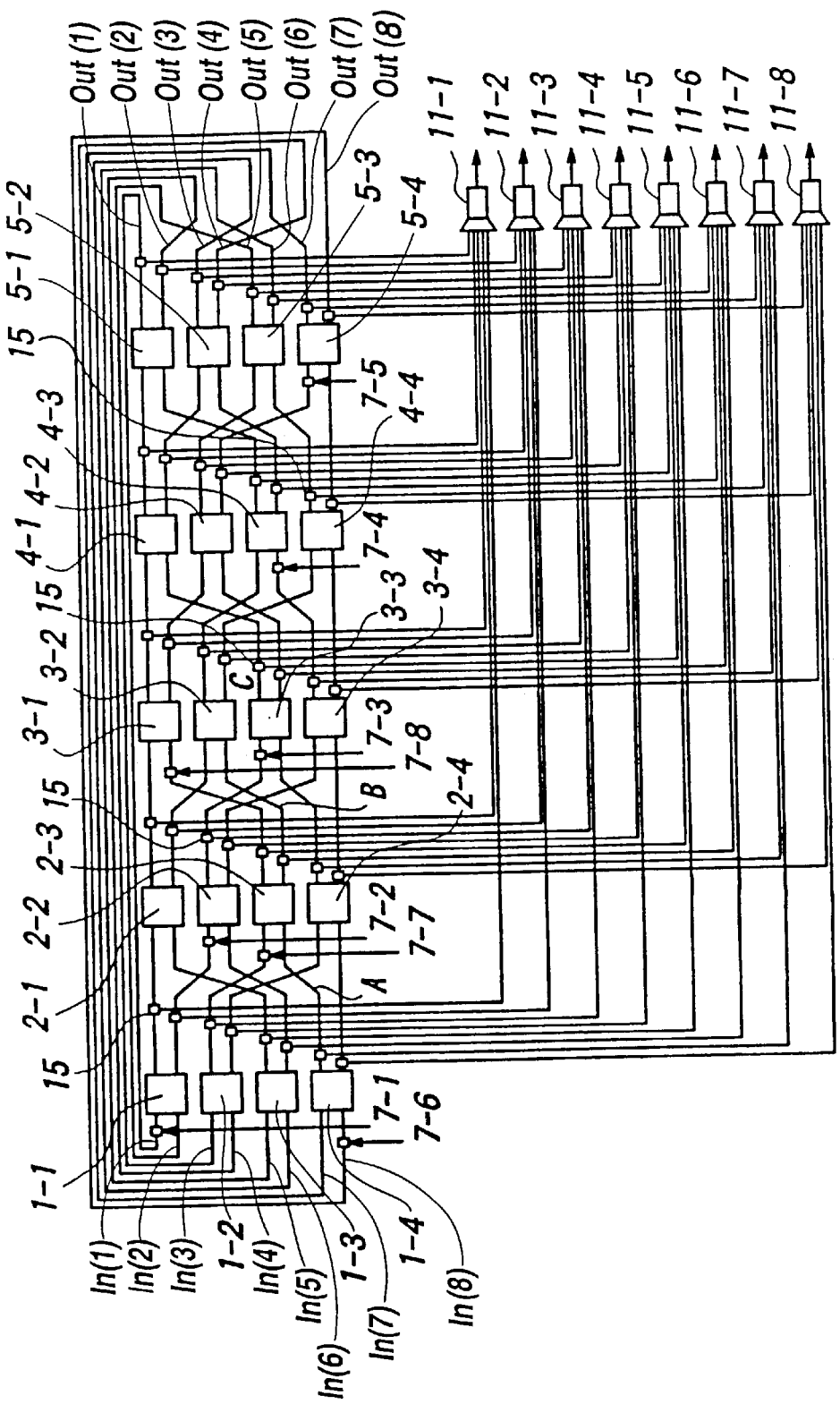
FIG. 1 is a circuit diagram showing an example in the input distribution type packet switch network of the present invention.

FIG. 1 is a circuit diagram showing an example in the input distribution type packet switch network.

In the switch network in FIG. 1, 2×2 switch elements are arranged vertically in 4-stage and laterally in 5-stage, and are connected in accordance with Shuffle type topology to constitute a 8×8 switch network. The output links "in(1)" to "in(8)" of the switch elements 5-1 to 5-4 are connected to the input links "out(1)" to "out(8)" of the switch elements 1-1 to 1-4, and thereby, the switch network has a ring architecture.

The packet input modules for the switch network are arranged and distributed laterally in the switch network. Concretely, the packet input modules 7-1 and 7-6 are placed at the leftmost-first stage switch elements 1-1 and 1-4, respectively, and the packet input modules 7-2 and 7-7 are placed at the second stage switch elements 2-2 and 2-3, respectively.

Then, the packet input modules 7-3 and 7-8 are placed at the third stage switch elements 3-1 and 3-3, respectively, and the packet input modules 7-4 and 7-5 are placed at the fourth and fifth stage switch elements 4-3 and 5-4, respectively.

The output ports of each switch element are connected to packet output modules 11-1 to 11-8 via filters 15.

In the input distribution type packet switch network in FIG. 1, as mentioned above, the packet input modules are arranged and distributed at each stage switch element. Therefore, since the input packets are distributed entirely into the switch network even if a large traffic is applied, the collision of the packets at some switch elements can be reduced. As a result, the misroutings and re-routings of the packets can be reduced and thus, the packet loss can be repressed.

For example, if all the packet input modules are arranged in the leftmost side of the switch network as in the MS4 switch, the packets output from the switch elements 1-1 and 1-3 are collided each other at the switch element 2-1. In the input distribution type packet switch of the present invention, however, the packet input module is not provided at the switching element 1-3, and the packet input modules 7-3 and 7-4, which correspond to the one at the element 1-3, are placed and distributed at the third and fourth stage switch elements, respectively.

Therefore, the above packet collision at the switch element 2-1 can be prevented and the misrouting of the packet in the switch network can be reduced.

Moreover, in the input distribution type packet switch network of this invention in FIG. 1, the rightmost and leftmost switch elements constituting the switch network are connected one another, and thereby, the switch network has the ring architecture. Therefore, even if the packet input modules are provided at the backward stage switch elements laterally in the switch network, the input packets are transmitted to the leftmost switch elements from the rightmost switch elements. As a result, even though the packet input modules are arranged and distributed, the packets can be output.

If the switch network does not have the ring architecture, for example, the packet input from the packet input module 7-5 is passed through the switch element 5-4, and is output only to the output parts 11-7 and 11-8 from its output port. Therefore, if the switching header of the packet has the address to be output from the output part 11-1, the packet can not be switched appropriately, and be output outside.

Since the switch network has the ring architecture according to the present invention, for example, the packet input from the packet input module 7-5 is passed through the switch element 5-4, and is transmitted to the input link "in(8)" at the switch element 1-4 from the output link "out(8)" at the switch element 5-4. Then, the packet is passed through the switch element 1-4, and routed to the switch elements 2-3 and 3-1 successively. The packet is passed through the switch element 1-4 and output to the output part 11-1 from its output port. As a result, the packet input at the backward stage switch element can be switched in the switch network entirely, and taken out outside as a necessary information.

In addition, the backward stage switch elements such as element 5-4 and the frontward stage switch elements such as element 1-4 are effectively used, resulting in the increase of the utilization efficiency of the switch elements. Therefore, the number of the switch elements in the switch network can be decreased and thereby, the size of the switch network can be reduced.

In the switch network in FIG. 1, filters are provided, backward from the switch elements, in between the output ports and the output parts, respectively. The filter checks the count value of the switching header of the packet in routing the packet in the packet switching as described later.

The input distribution type packet switch network in FIG. 1 has 4-stage switch elements vertically and 5-stage switch elements laterally, but can have any stage switch elements vertically and laterally. However, since the packet loss can be repressed as the switch network has large stage switch elements, it is preferable that the switch elements are arranged vertically in N/2 stages and laterally in $\log_2 N$ stages in N×N switch network.

As shown in FIG. 1, since the packet input modules are arranged and distributed laterally in the switch network, the packet applied from a given packet input module into a given switch element may collide with the routed packet from the previous stage switch element. For example, it means that the packet applied from the packet input module 7-3 into the switch element 3-3 collides with the routed packet from the previous stage switch element 2-2.

Therefore, in order to prevent the collision of the packet, buffers (hereinafter, called as an "input buffer") may be preferably provided in between the packet input modules and the switch elements continuing to the input modules, respectively. Thereby, since a new packet input into a given switch element and a routed packet from the previous stage switch element are stored in the input buffer for the meantime, and are output sequentially, the packet collision can be prevented in the given switch element.

For example, if the input buffer is provided in between the packet input module 7-7 and the switch element 2-3, the new packet input into the switch element 2-3 and the routed packet from the switch element 1-2 are stored in the input buffer for the meantime, and thereafter, are output sequentially. As a result, the packets can be prevented from being collided each other at the switch element 2-3.

Moreover, in the packet output parts 11-1 to 11-8 in FIG. 1, concentrators and buffers (hereinafter, called as an "output buffer") may be preferably provided.

The output buffers are provided in order to prevent waiting time losses of packets in that the plurality of packet arrives at a given output port at the same time. Each output buffer stores some from among the packets output from the switch network, and the storing ability is set to a given level and below in order not to overload a hardware to be used for the switch network. In this case, if a traffic concentration is brought about, many packets arrive at a given output buffer at the same time over the given level and thus, the substantial packets overflow to bring about many packet losses.

Therefore, it is desired that besides the output buffers, the concentrators are provided in the packet output parts.

Thereby, even if the traffic concentration is brought out, excess packets are disposed, so that the packet losses can be repressed.

Figure 2:
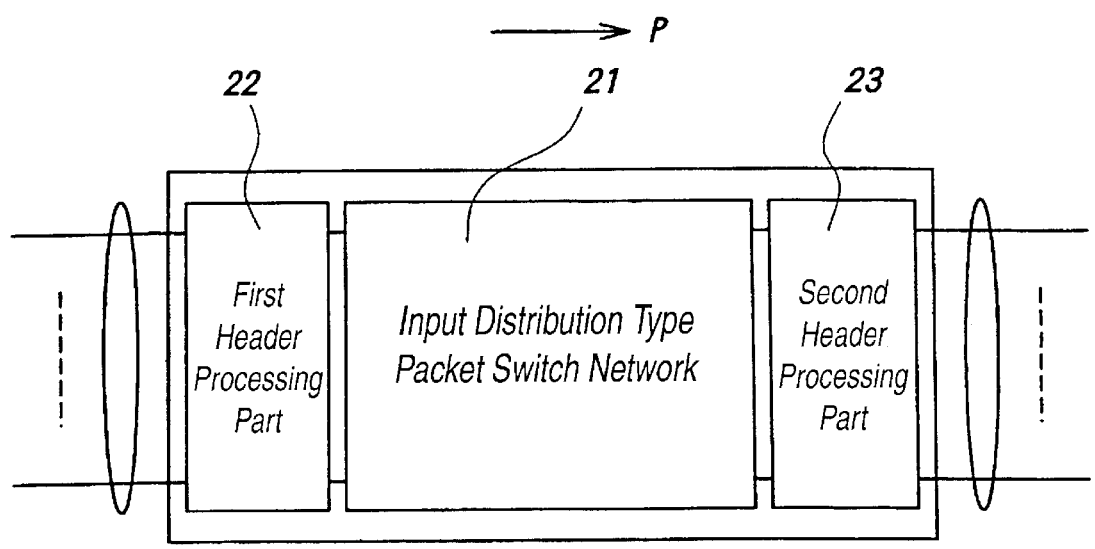
FIG. 2 is a schematic view showing an example in the input distribution type packet switch of the present invention.

FIG. 2 is a schematic view showing an example in the input distribution type packet switch using the above input distribution type packet switch network.

The input distribution type packet switch comprises an input distribution type packet switch network 21 having the above architecture, a first header processing part 22 and a second header processing part 23. Herein, the arrow P in the figure designates the switching direction of the packet.

Figure 3:
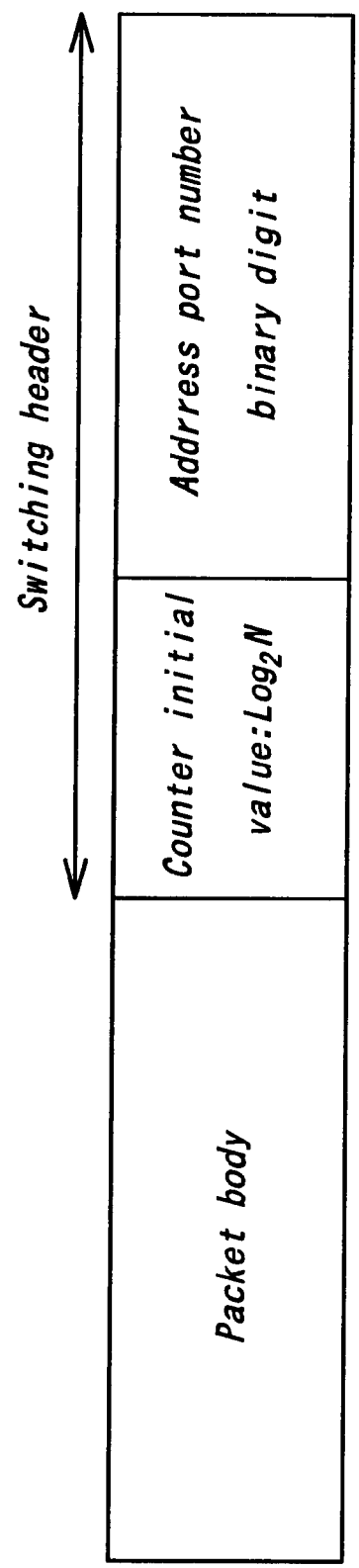
FIG. 3 is a format construction of a switching header in the input distribution type packet switch of the present invention.

In the first header processing part 22 in the input side of the switch, a switching header is added to an input packet. The switching header, as shown in FIG. 3, comprises a counter and an address port number, and is added to the header of the input packet.

The counter is set to an initial value $\log_2 N$ and is decremented by "1" at every time when the packet is routed appropriately in the switch network and arrives at a predetermined switch element. Since the packet is properly routed in the switch network until the counter value is zero, it is output outside via the output port of the switch element.

The address port number is information to reach the output port, that is, the output part for the input packet to be output, and is denoted by a binary digit of "0" and "1".

For example, supposed that the switching header having the initial counter value of "3" and the address port number of (101) is added to a given packet in the first header processing part and the packet is input into the switch network 21 shown in FIG. 1 from the packet input module 7-6. In this case, the switch element 1-4 refers to the forefront number "1" of the address port number (101), and outputs the packet for the upper output port "A" to route the switch element 2-3. In this case, since the routing is carried out properly, the counter value is diminished by "1" to have a value of "2".

Before the packet is routed to the switch element 2-3, the counter value thereof is checked by the filter 15 provided before the switch element. Since the packet has the counter value of "2", it is routed again at the switch element 2-3. The second digit "0" in the address port number is referred, and thus, the packet is output for the lower output port "B" and routed to the switch element 3-2. Since the routing is performed properly, the counter value is diminished by "1" to have a value of "1".

As mentioned above, the counter value is referred at the filter before the switch element 3-2, and the packet is routed at the switch element 3-2. The third digit "1" in the address port number is referred, and thus, the packet is output for the upper output port "C". The counter value is decremented by "1" to have a value of "0", and is checked at the filter before the switch element 4-1. As a result, the packet is output for the packet output part 11-5, not routed for the switch element 4-1.

In this case, after the switching header is removed from the packet at the second header processing part 23, the packet is output.

Herein, if in the routing process, the packet is misrouted due to the packet collision, the packet is re-routed at the next stage switch element. In this case, the counter value is reset to the initial value, and the packet is re-routed from the start.

EXAMPLE

The simulation for the input distribution type packet switch of the present invention was carried out. The simulation condition are listed as follows:

(1) Switching Condition

The number of 2×2 switch element: 32 (32 stages) vertically in the switch network The number of packet input module: 64

The transmission speed: 155.52 (Mbps)

(2) Traffic Condition

The length of packet: 20 octets in header, 1 to 1480 octets in data

The time interval of packet arrival: following exponential distribution

The packet input module: arranging uniformly over the whole switch elements

The traffic quantity: 60%

Figure 4:
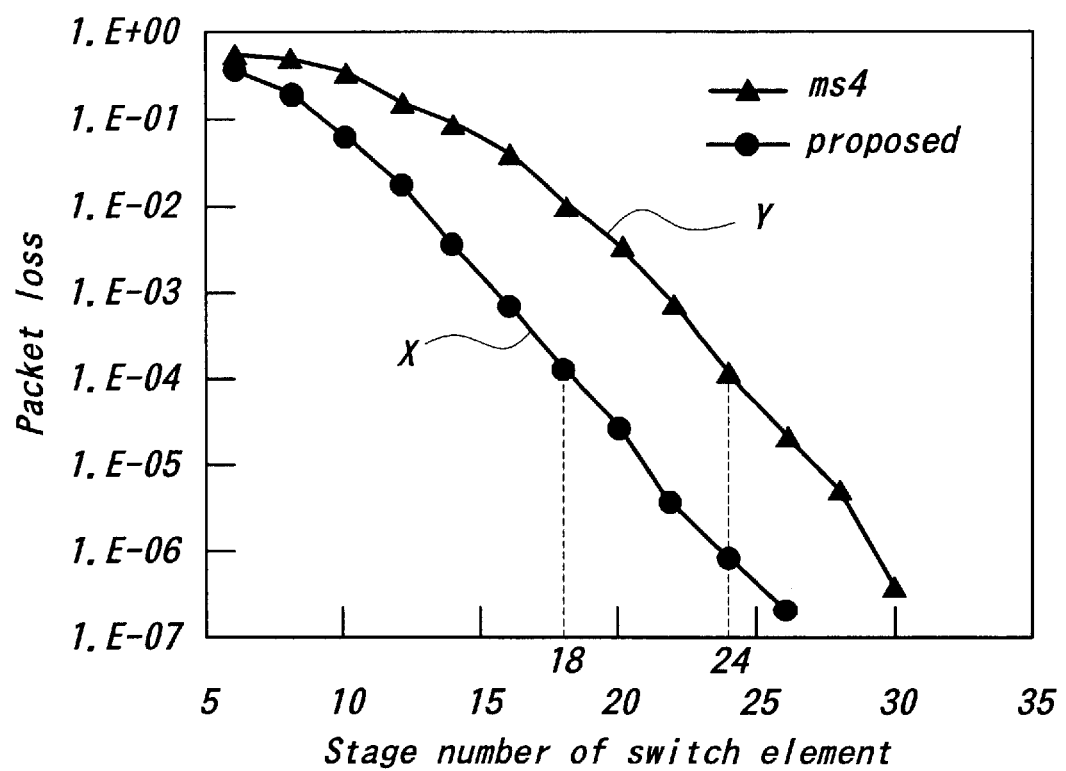
FIG. 4 is a simulated result in the input distribution type packet switch of the present invention.

FIG. 4 shows the relation between the packet loss and the stage number of switch element in uniform traffic in the above simulation condition. For comparison, FIG. 4 also shows the relation in the conventional MS4 switch.

It is turned out that the input distribution type packet switch of the present invention which is depicted by the curve "X" has smaller packet loss than the MS4 switch which is depicted by the curve "Y" in the case that they have the same stage number of switch element. For example, in the stage number of switch element of "24", the input distribution type packet switch has an extremely small packet loss of about $1 \times 10^{-6}$, but the MS4 switch has a packet loss of about $1 \times 10^{-4}$.

Moreover, for achieving the same packet loss, the input distribution type packet switch requires smaller stage number of switch element than the MS4 switch. For example, to obtain a packet loss of about $1 \times 10^{-4}$, the input distribution type packet switch requires a stage number of switch element of only 18, but the MS4 switch does a stage number of 24.

Consequently, the input distribution type packet switch of the present invention has an extremely small packet loss than the MS4 switch, and the switch elements in the packet switch are used effectively.

Not described in detail, the above results can be obtained in non-uniform traffic.

Although the present invention was described in detail with reference to the above examples, this invention is not limited to the above disclosure and every kind of variation and modification may be made without departing from the scope of the present invention.

As mentioned above, according to the present invention, since the switch network has the ring architecture and the packet input modules are arranged and distributed in the switch network, the packet collision can be reduced to repress the re-routing of the packet and thus, the packet loss can be reduced.

Moreover, since the switch elements in the switch network can be used more effectively, the switch network requires a smaller number of switch element than the conventional switch and thereby, the switch network itself can be miniaturized.

What is claimed is:

1. An input distribution packet switch network comprising a plurality of 2×2 switch elements and packet input modules for the switch network, the switch elements being arranged in multistage and connected in accordance with a Shuffle topology to constitute a N×N switch network ($N=2^k$, k: integer number of 2 and over), the links of the leftmost and rightmost switch elements being connected to one another so that the N×N switch network has a ring architecture, the packet input modules being distributed laterally in the switch network, and outputs of the rightmost switch elements are linked to corresponding inputs of the leftmost switch elements.

2. The input distribution packet switch network as defined in claim 1, wherein the plurality of switch elements are arranged vertically in N/2 stage and laterally in log$_2$N stage and over in the N×N switch network.

3. The input distribution packet switch network as defined in claim 1, further comprising packet output ports for the N×N switch network, the output ports of the switch elements being connected to packet output modules for the N×N switch network, respectively.

4. The input distribution packet switch network as defined in claim 3, wherein filters are provided in between the output ports of the switch elements and the packet output modules, respectively.

5. The input distribution packet switch network as defined in claim 1, wherein input buffers are provided in the packet input modules, respectively.

6. The input distribution packet switch network as defined in claim 3, wherein the packet output modules comprise concentrators and output buffers, respectively.

7. The input distribution packet switch comprising the input distribution packet switch network as defined in claim 1, a first header processing part and a second header processing part, the first header processing part being provided in the input side of the input distribution packet switch network and adding a switching header to a packet, the second header processing part being provided in the output side of the input distribution packet switch network and removing the switching header.

8. The input distribution packet switch network as defined in claim 2, further comprising packet output ports for the N×N switch network, the output ports of the switch elements being connected to packet output modules for the N×N switch network, respectively.

9. The input distribution packet switch network as defined in claim 2, wherein input buffers are provided in the packet input modules, respectively.

10. An The input distribution packet switch comprising the input distribution type packet switch network as defined in claim 2, a first header processing part and a second header processing part, the first header processing part being provided in the input side of the input distribution packet switch network and adding a switching header to a packet, the second header processing part being provided in the output side of the input distribution type packet switch network and removing the switching header.

11. The input distribution packet switch comprising the input distribution packet switch network as defined in claim 3, a first header processing part and a second header processing part, the first header processing part being provided in the input side of the input distribution type packet switch network and adding a switching header to a packet, the second header processing part being provided in the output side of the input distribution packet switch network and removing the switching header.

12. The input distribution packet switch comprising the input distribution packet switch network as defined in claim 4, a first header processing part and a second header processing part, the first header processing part being provided in the input side of the input distribution packet switch network and adding a switching header to a packet, the second header processing part being provided in the output side of the input distribution packet switch network and removing the switching header.

13. The input distribution packet switch comprising the input distribution packet switch network as defined in claim 5, a first header processing part and a second header processing part, the first header processing part being provided in the input side of the input distribution packet switch network and adding a switching header to a packet, the second header processing part being provided in the output side of the input distribution packet switch network and removing the switching header.

14. The input distribution packet switch comprising the input distribution packet switch network as defined in claim 6, a first header processing part and a second header processing part, the first header processing part being provided in the input side of the input distribution packet switch network and adding a switching header to a packet, the second header processing part being provided in the output side of the input distribution packet switch network and removing the switching header.

* * * * *